United States Patent
Taniguchi et al.

(10) Patent No.: US 11,277,032 B2
(45) Date of Patent: Mar. 15, 2022

(54) ELECTRONIC APPARATUS, POWER SUPPLY SYSTEM AND POWER SUPPLY CONTROL METHOD

(71) Applicant: KABUSHIKI KAISHA TOSHIBA, Tokyo (JP)

(72) Inventors: Kentaro Taniguchi, Kawasaki Kanagawa (JP); Toshiya Mitomo, Kawasaki Kanagawa (JP)

(73) Assignee: KABUSHIKI KAISHA TOSHIBA, Tokyo (JP)

(*) Notice: Subject to any disclaimer, the term of this patent is extended or adjusted under 35 U.S.C. 154(b) by 0 days.

(21) Appl. No.: 17/015,866

(22) Filed: Sep. 9, 2020

(65) Prior Publication Data

US 2021/0296935 A1  Sep. 23, 2021

(30) Foreign Application Priority Data

Mar. 18, 2020 (JP) .............................. JP2020-047917

(51) Int. Cl.
*H02J 50/20* (2016.01)
*H02J 50/70* (2016.01)
*H04W 74/08* (2009.01)

(52) U.S. Cl.
CPC .............. *H02J 50/20* (2016.02); *H02J 50/70* (2016.02); *H04W 74/0808* (2013.01)

(58) Field of Classification Search
CPC .. H02J 50/10; H02J 50/12; H02J 50/20; H02J 50/70; H04W 74/0808
USPC ......................................................... 307/104
See application file for complete search history.

(56) References Cited

U.S. PATENT DOCUMENTS

| 4,809,257 A * | 2/1989 | Gantenbein ........ H04B 10/1149 398/128 |
| 10,770,925 B2 | 9/2020 | Tandai et al. |
| 2008/0030336 A1* | 2/2008 | Endo .................... G06K 7/0008 340/572.1 |
| 2008/0069041 A1* | 3/2008 | Tandai .............. H04W 74/0866 370/329 |

(Continued)

FOREIGN PATENT DOCUMENTS

| JP | 2014155399 A | 8/2014 |
| JP | 2020092519 A | 6/2020 |
| JP | 2021035257 A | 3/2021 |

OTHER PUBLICATIONS

U.S. Appl. No. 16/808,136; First Named Inventor: Kentaro Taniguchi; Title: "Electronic Device and Method"; filed Mar. 3, 2020.

(Continued)

*Primary Examiner* — Levi Gannon
(74) *Attorney, Agent, or Firm* — Holtz, Holtz & Volek PC

(57) ABSTRACT

According to one embodiment, an electronic apparatus includes power transmission circuitry, and detection circuitry. The power transmission circuitry transmits power by an electromagnetic wave with a first frequency band. The detection circuitry receives a reception signal and performs carrier sense with a second frequency band different from the first frequency band. The detection circuitry includes interference avoidance circuitry that eliminates a signal having a third frequency band which is a part of the second frequency band from the reception signal.

7 Claims, 9 Drawing Sheets

(56) References Cited

U.S. PATENT DOCUMENTS

| | | | |
|---|---|---|---|
| 2009/0059877 A1* | 3/2009 | Utsunomiya | H04W 74/0808 370/338 |
| 2009/0279588 A1* | 11/2009 | Mochizuki | H04L 27/2647 375/137 |
| 2012/0112555 A1* | 5/2012 | Toshimitsu | H02J 50/80 307/104 |
| 2013/0028110 A1* | 1/2013 | Kogawa | H04W 74/0808 370/252 |
| 2017/0374618 A1* | 12/2017 | Ramjee | H04W 8/22 |
| 2018/0159648 A1* | 6/2018 | Kobayashi | H04J 3/10 |
| 2019/0268937 A1* | 8/2019 | Nonin | H04L 25/0204 |
| 2020/0044492 A1 | 2/2020 | Taniguchi | |
| 2020/0052530 A1 | 2/2020 | Adachi et al. | |
| 2020/0076239 A1 | 3/2020 | Taniguchi et al. | |
| 2020/0185966 A1 | 6/2020 | Asanuma | |
| 2020/0185975 A1 | 6/2020 | Taniguchi | |
| 2021/0067199 A1 | 3/2021 | Taniguchi | |
| 2021/0067200 A1 | 3/2021 | Taniguchi | |
| 2021/0075267 A1 | 3/2021 | Taniguchi | |

OTHER PUBLICATIONS

U.S. Appl. No. 16/808,189; First Named Inventor: Kentaro Taniguchi; Title: "Electronic Device"; filed Mar. 3, 2020.

U.S. Appl. No. 16/816,169; First Named Inventor: Kentaro Taniguchi; Title: "Electronic Apparatus and Method"; filed Mar. 11, 2020.

U.S. Appl. No. 17/014,383; First Named Inventor: Kentaro Taniguchi; Title: "Power Supply Apparatus" filed Sep. 8, 2020.

* cited by examiner

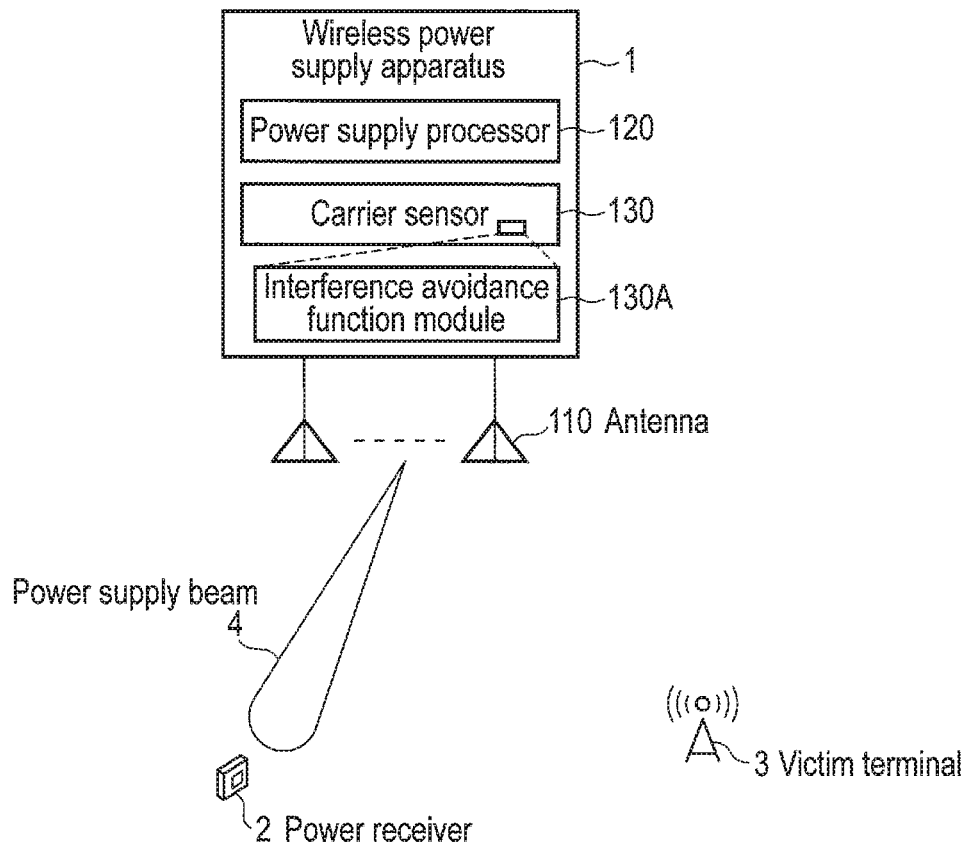
F I G. 1
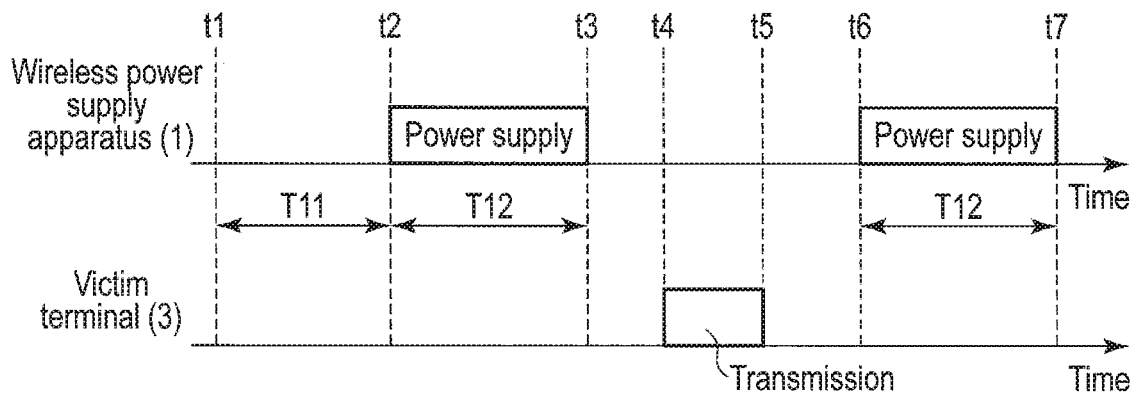
F I G. 2

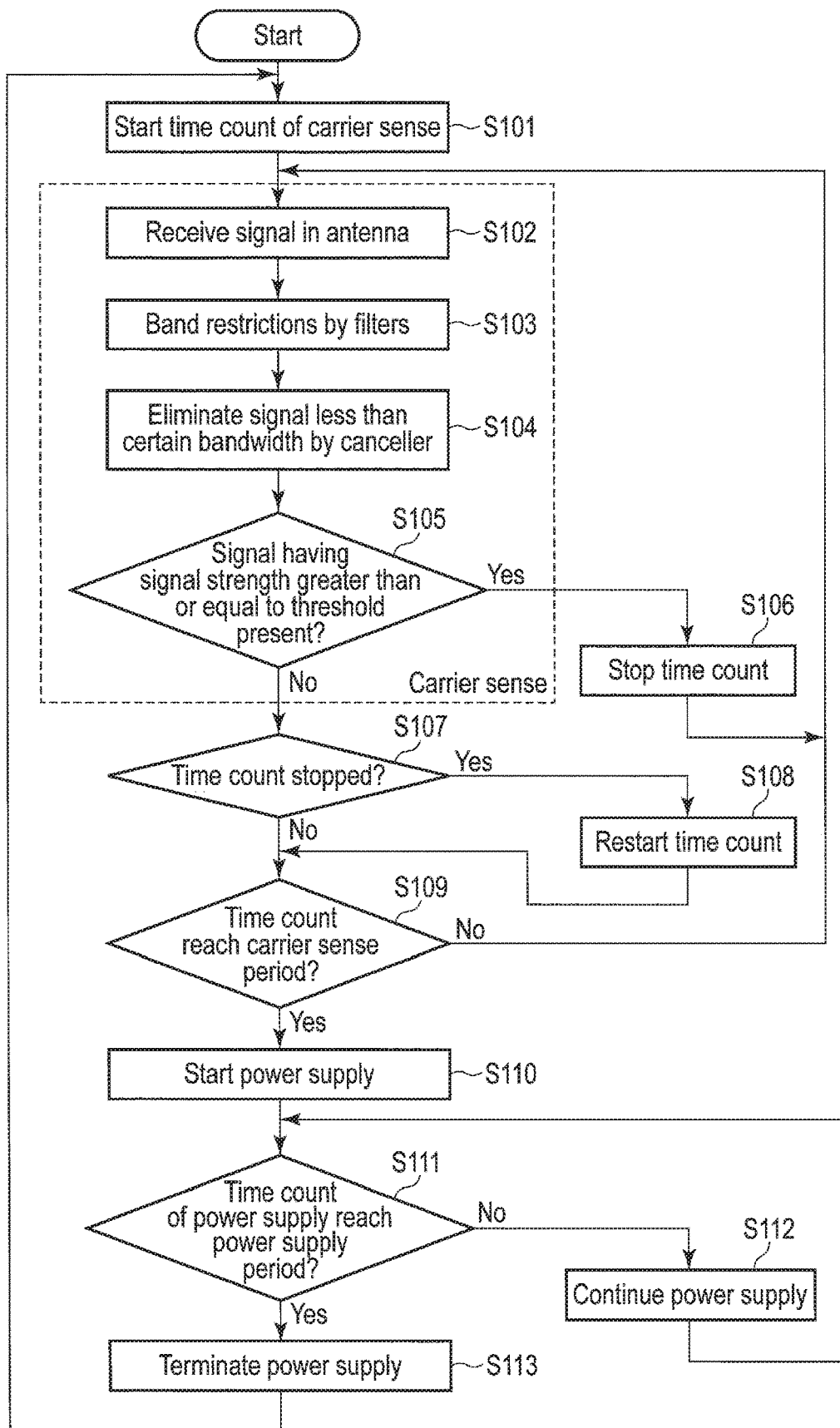
F I G. 6

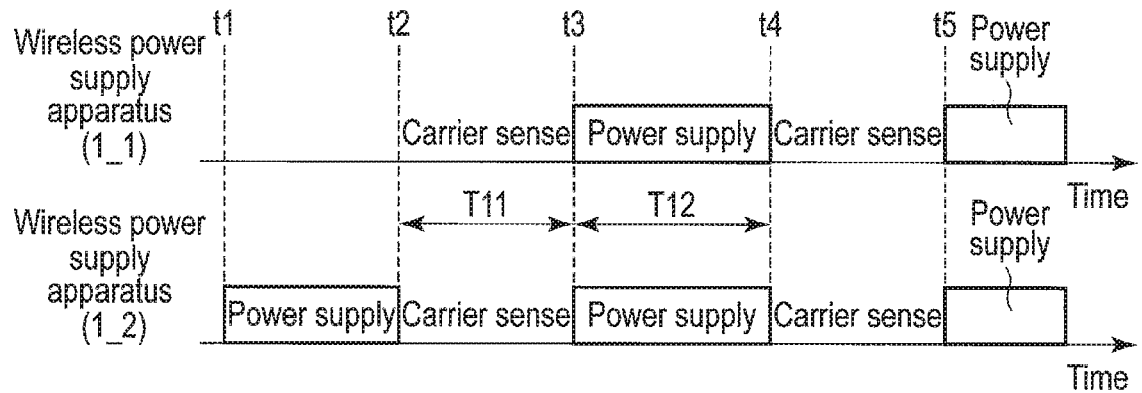
F I G. 9
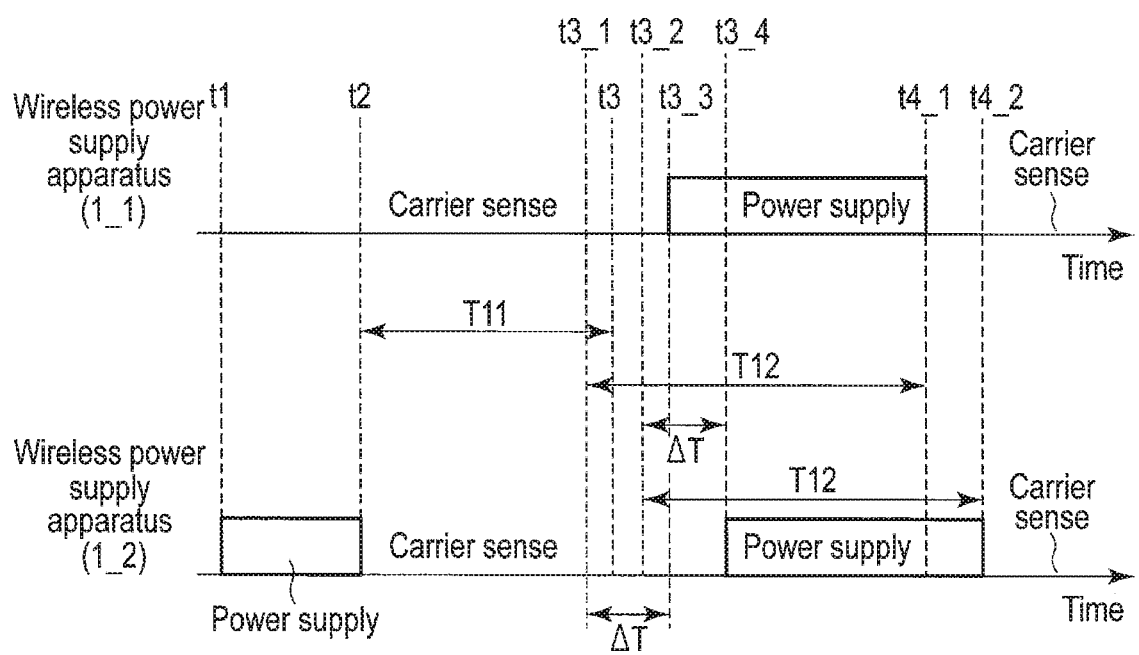
F I G. 10

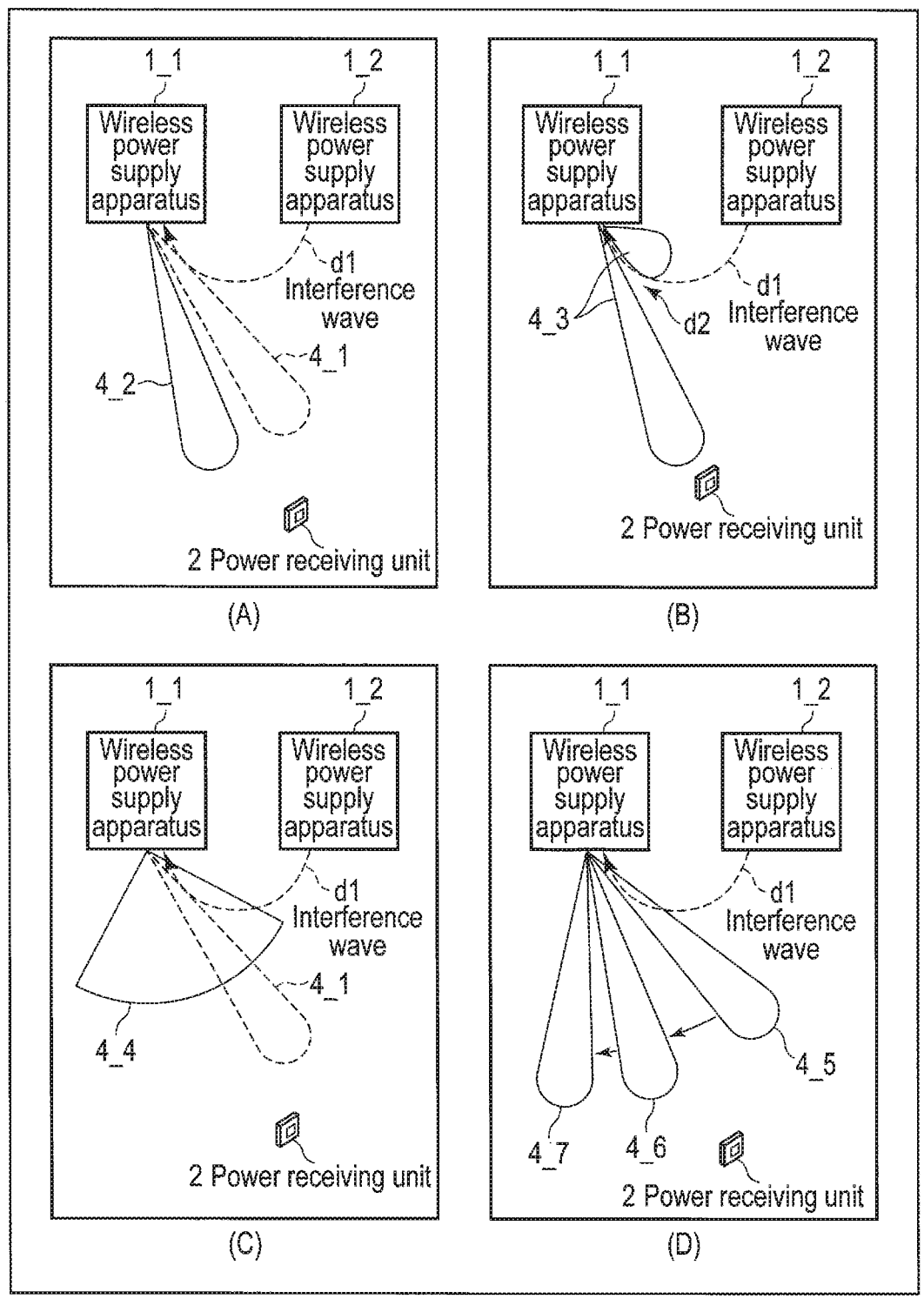
F I G. 12

ELECTRONIC APPARATUS, POWER SUPPLY SYSTEM AND POWER SUPPLY CONTROL METHOD

CROSS-REFERENCE TO RELATED APPLICATIONS

This application is based upon and claims the benefit of priority from Japanese Patent Application No. 2020-047917, filed Mar. 18, 2020, the entire contents of which are incorporated herein by reference.

FIELD

Embodiments described herein relate generally to an electronic apparatus, a power supply system and a power supply control method.

BACKGROUND

In recent years, a wireless power supply technology for performing power transmission using electromagnetic waves has been drawing attention. A wireless power supply apparatus which transmits electromagnetic waves for power supply to a power receiving device comprises, for example, a structure for avoiding interference with respect to a wireless system which performs wireless communication in the same space. In other words, the wireless power supply apparatus comprises a structure for coexistence with a wireless system. For example, when the wireless power supply apparatus transmits electromagnetic waves for power supply, the wireless power supply apparatus monitors the surrounding environment of the device and confirms whether or not the wireless signal of a wireless system is present. The procedure is called carrier sense, etc.

A plurality of wireless power supply apparatuses which supply power to different power receiving devices may be present in the same environment. In this case, there is a possibility that the carrier sense performed in a wireless power supply apparatus is affected by the electromagnetic waves for power supply transmitted by another wireless power supply apparatus. In other words, there is a possibility that the carrier sense performed in a wireless power supply apparatus is affected by the electromagnetic waves for power supply transmitted by another wireless power supply apparatus, thereby producing erroneous results in which the wireless signal of another wireless system is present although such a wireless signal is not present.

BRIEF DESCRIPTION OF THE DRAWINGS

FIG. 1 is a diagram showing a configuration example of a wireless power supply system according to a first embodiment.

FIG. 2 is a timing chart showing an example of a carrier sense process and a power supply process in a wireless power supply apparatus according to the first embodiment.

FIG. 6 is a flowchart showing an example of the procedure of the carrier sense process and the power supply process performed by the power supply apparatus according to the first embodiment.

FIG. 9 is a timing chart showing an example of a carrier sense process and a power supply process in the power supply apparatus according to the second embodiment.

FIG. 10 is a timing chart showing an example of a power supply process in consideration of the clock difference in the power supply apparatus according to the second embodiment.

FIG. 12 is a diagram showing an example of the change in the directivity in a power supply apparatus according to the third embodiment.

DETAILED DESCRIPTION

Figure 3:
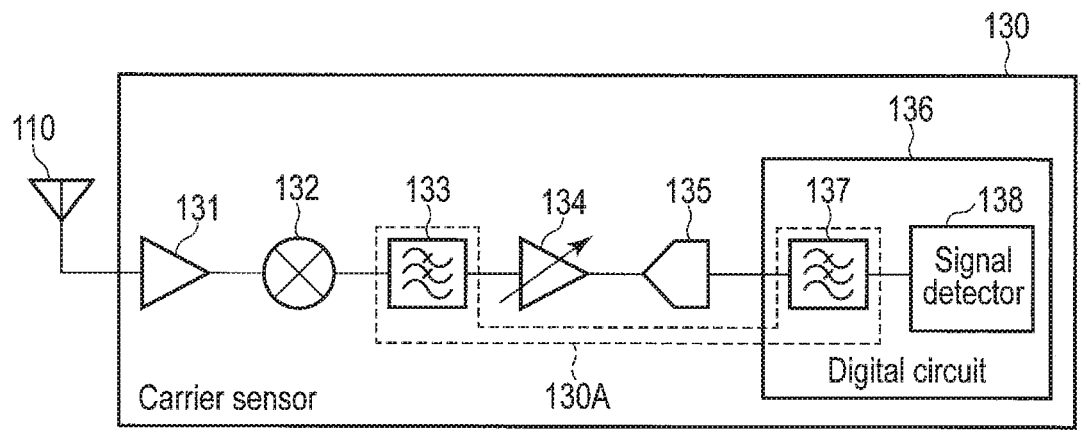
FIG. 3 is a diagram showing a configuration example of a carrier sensor comprising interference avoidance function in the power supply apparatus according to the first embodiment.

Various embodiments will be described hereinafter with reference to the accompanying drawings.

In general, according to one embodiment, an electronic apparatus includes power transmission circuitry, and detection circuitry. The power transmission circuitry is configured to transmit power by an electromagnetic wave with a first frequency band. The detection circuitry is configured to receive a reception signal and to perform carrier sense with a second frequency band different from the first frequency band. The detection circuitry includes interference avoidance circuitry configured to eliminate a signal having a third frequency band which is a part of the second frequency band from the reception signal.

First Embodiment

A first embodiment is explained.

FIG. 1 is a diagram showing a configuration example of a wireless power supply system according to the present embodiment.

A wireless power supply apparatus 1 supplies power to a power receiver 2 which is present in a power supply area by forming an electromagnetic beam (power supply beam 4). As the power supply beam 4 is an electromagnetic wave having a specific frequency, when another wireless system using the same frequency or a near frequency is present around the wireless power supply apparatus 1, the power supply beam 4 may interfere with the wireless system. Hereinafter, a wireless system with which the power supply apparatus may interfere is referred to as a victim system. The terminal of a victim system is referred to as a victim terminal 3. To avoid interference with a victim system, the wireless power supply apparatus 1 should preferably perform a process for confirming that no victim terminal 3 is present around the wireless power supply apparatus 1 before performing power supply. This confirming process is called carrier sense. The wireless power supply system of the present embodiment shown in FIG. 1 is a wireless power supply system comprising a carrier sense function. The frequency band (second frequency band) for performing carrier sense is different from the frequency band for performing power supply (first frequency band). For example, the first frequency band does not overlap the second frequency band. Alternatively, for example, a part of the first frequency band overlaps a part of the second frequency band.

As shown in FIG. 1, the wireless power supply apparatus 1 comprises an antenna 110, a power supply processor 120 and a carrier sensor 130. The carrier sensor 130 comprises an interference avoidance function module 130A.

The wireless power supply apparatus 1 supplies power to the power receiver 2 by forming the power supply beam 4. Before supplying power, the wireless power supply apparatus 1 attempts to detect the signal of the victim terminal 3 around the wireless power supply apparatus 1 in the carrier sensor 130. A single antenna 110 and a single power receiver 2 may be provided. Alternatively, a plurality of antennae 110 and a plurality of power receivers 2 may be provided. A common antenna may be provided for power supply and carrier sense. Alternatively, an antenna for power supply and an antenna for carrier sense may be separately provided. For the power supply beam 4, a single beam with a sharp directivity may be formed, or a beam may be formed in a wide direction, or a beam. which branches into two or more may be formed.

FIG. 2 is a timing chart showing an example of a carrier sense process and a power supply process in the wireless power supply apparatus 1.

The wireless power supply apparatus 1 determines a carrier sense threshold. Th and a carrier sense period T11 in advance. These values may be determined based on specification values such as the receiver sensitivity or acceptable interfering level of victim systems assumed to coexist with the wireless power supply apparatus 1. Alternatively, these values may be determined based on a computing simulation or link-budget calculation simulating coexistence environment between the wireless power supply apparatus 1 and victim systems. The wireless power supply apparatus 1 starts a carrier sense process at time t1 before power supply. Specifically, the wireless power supply apparatus 1 receives wireless signals via the antenna 110 and confirms whether or not a signal at a level exceeding the carrier sense threshold Th determined in advance is present. When no signal at a level exceeding the carrier sense threshold Th is present, the wireless power supply apparatus 1 determines the state as channel idle, in other words, determines that the channel is idle. When a signal at a level exceeding the carrier sense threshold Th is present, the wireless power supply apparatus 1 determines the state as channel busy, in other words, determines that the channel is used by a victim system.

The wireless power supply apparatus 1 starts the time count for a carrier sense process from time t1. When no signal at a level exceeding the carrier sense threshold Th is detected until the time count reaches the carrier sense period T11, in other words, until time t2, the wireless power supply apparatus 1 starts a power supply process. The power supply process is performed from time t2 for only the power supply period T12 determined in advance, and stopped at time t3. The wireless power supply apparatus 1 starts the time count of carrier sense again from time t3. When a signal exceeding the carrier sense threshold Th is detected at halfway time t4, the wireless power supply apparatus 1 stops the time count of carrier sense. When the level of the received signal is decreased to the carrier sense threshold Th at subsequent time t5, the wireless power supply apparatus 1 starts the time count of carrier sense again, and starts a power supply process again at time t6 at which the time count matches the carrier sense period T11. Thus, (t6−t5)+(t4−t3) =T11. After the start of power supply, the wireless power supply apparatus 1 performs power supply for only the power supply period T12, and stops transmission at time t7.

When this carrier sense is performed, coexistence between the wireless power supply apparatus 1 and a victim system is possible. However, when a plurality of wireless power supply apparatuses 1 are present in the same environment, and each of the wireless power supply apparatuses 1 independently operates, the power supply signals from the wireless power supply apparatuses 1 and the transmission signal from a victim system are mixed, and the carrier sense function may not be effectively performed. In other words, when a wireless power supply apparatus 1 performs carrier sense, the wireless power supply apparatus 1 may misinterpret the power supply signal from another wireless power supply apparatus 1 as the transmission signal of a victim system and postpone power supply. Thus, the efficiency of power supply may be decreased. The wireless power supply apparatus 1 of the present embodiment solves this problem by comprising an interference avoidance function (in other words, by providing the Interference avoidance function module 130A in the carrier sensor 130).

Conventionally, for example, a power supply apparatus comprising a wireless communication function for power supply control and performing carrier sense to avoid interference with the wireless communication function has been present. However, in this power supply apparatus, interference with another wireless system (victim system) or interference between a plurality of power supply apparatuses has not been considered. Since the wireless power supply apparatus 1 of the present embodiment comprises both a carrier sense function and an interference avoidance function, the wireless power supply apparatus 1 is allowed to avoid both interference with a victim system and interference with respect to another wireless power supply apparatus 1.

FIG. 3 shows a configuration example of the carrier sensor 130 comprising an interference avoidance function (interference avoidance function module 130A) in the wireless power supply apparatus 1 according to the present embodiment.

The carrier sensor 130 of the wireless power supply apparatus 1 amplifies a signal received via the antenna 110 in a low-noise amplifier 131, and downconverts it into a baseband or an intermediate frequency band via a mixer 132. Subsequently, a band restriction process is performed in an analog filter 133. The signal is amplified in a variable gain amplifier 134. The received analog signal is converted into a digital signal in an analog-digital converter 135 and transmitted to a digital circuit 136. In the digital circuit 136, band restrictions are applied to the received signal by a digital filter 137, and the signal is subsequently transmitted to a signal detector 138. The signal detector 138 determines whether or not the level of the received signal exceeds the carrier sense threshold Th. The analog-digital converter 135 and the digital circuit 136 may be replaced by an analog power detector.

Figure 4:
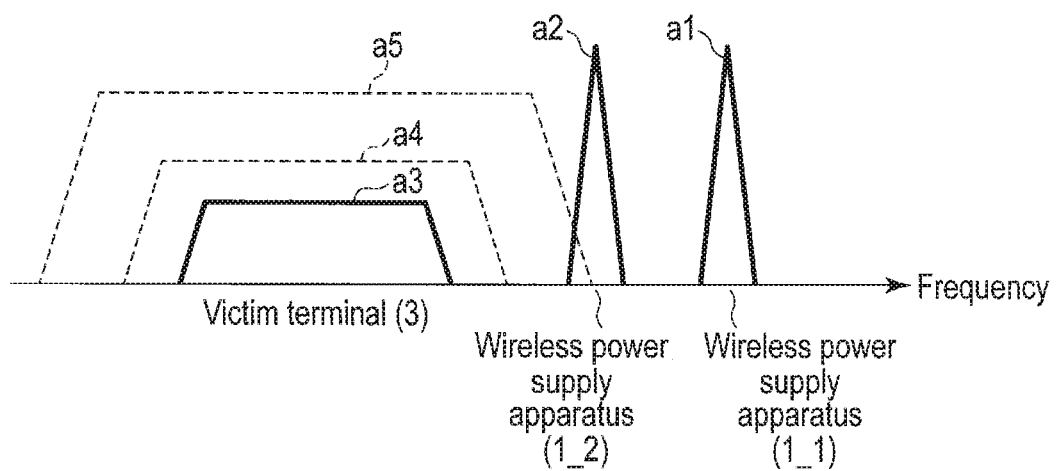
FIG. 4 is a diagram showing an example of frequency spectra in environment where one or more wireless systems and a plurality of power supply apparatuses coexist.

In the carrier sensor 130 shown in FIG. 3, the analog filter 133 and the digital filter 137 included in the interference avoidance function module 130A eliminate an interference signal from another wireless power supply apparatus 1. In other words, the analog filter 133 and the digital filter 137 restrict the target of carrier sense to a signal which can be assumed to be the of a wireless system. FIG. 4 shows an example of frequency spectra in environment where one or more wireless systems and a plurality of wireless power supply apparatuses 1 coexist. In the example of frequency spectra in FIG. 4, the vertical axis indicates the signal strength, and the horizontal axis indicates the frequency. In FIG. 4, frequency spectrum a1 is an example of the frequency spectrum of wireless power supply apparatus 1_1, and frequency spectrum a2 is an example of the frequency spectrum of another wireless power supply apparatus 1_2 adjacent to wireless power supply apparatus 1_1. These spectra are steep line spectra or narrow-bandwidth spectra. The frequency bands are not widened as the power supply signals of the wireless power supply apparatuses 1 are electromagnetic waves which do not include information or electromagnetic waves which include only the data modulated at a very low rate.

Frequency spectrum a3 is an example of the frequency spectrum of a victim terminal 3 which uses the near bands of frequency bands a1 and a2 used by the wireless power supply apparatuses 1 (1_1 and 1_2). Frequency spectrum a3 of the victim terminal 3 is a frequency spectrum having a constant bandwidth. The frequency bandwidth is widened as the transmission signals of victim systems which perform wireless communication invariably include a certain amount of data. For example, to determine whether or not a victim system coexists with wireless power supply apparatus 1_1, wireless power supply apparatus 1_1 attempts to detect frequency spectrum a3 of the victim system. At this time, there is a possibility that the power of frequency spectrum a2 of another wireless power supply apparatus 1_2 is erroneously determined as the signal power of the victim terminal 3. To solve this problem, the analog filter 133 and the digital filter 137 (included in the interference avoidance function module (130A) shown in FIG. 3 apply band restrictions to the vicinity of the frequency band used by the victim system. Specifically, the effect of the interference signal from another wireless power supply apparatus 1_2 is avoided by setting the passbands of the analog filter 133 and the digital filter 137 so as to extract frequency band a4 shown in FIG. 4. For example, frequency band a4 includes frequency band a3. For example, frequency band a4 does not include at least a part of frequency band a2.

Figure 5:
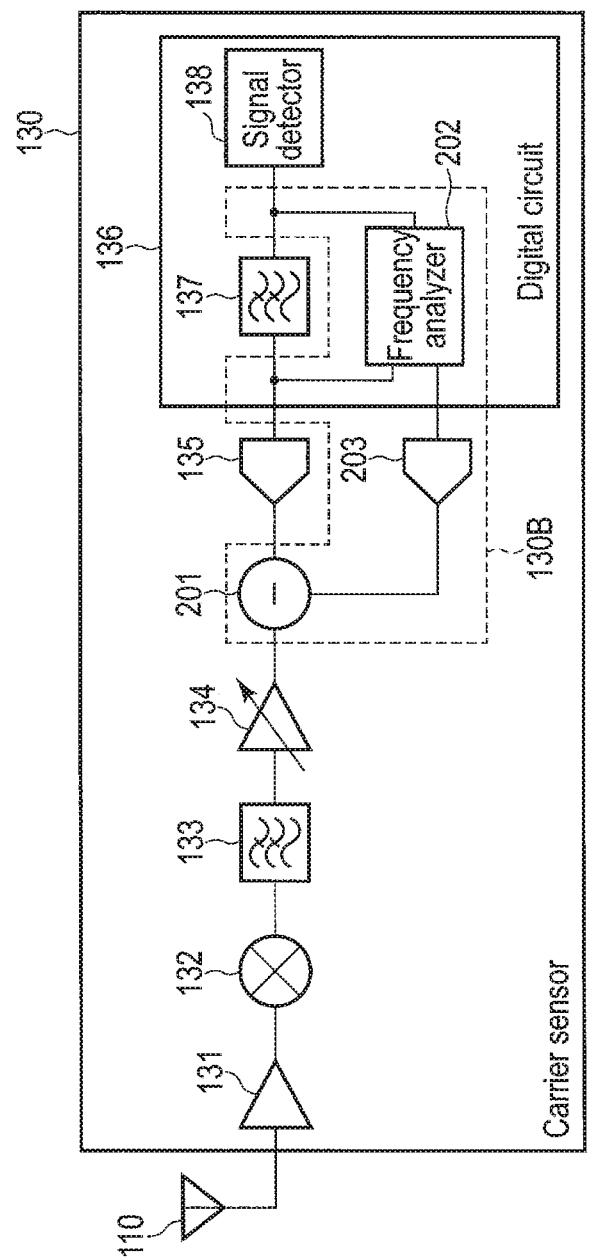
FIG. 5 is a diagram showing a configuration example of the carrier sensor comprising an interference canceller function in the power supply apparatus according to the first embodiment.

Only one of the analog filter 133 and the digital filter 137 may be used for band restrictions. Passband a4 of the filters should be preferably set such that all the frequency bands which may be used by wireless power supply apparatus 1_1 and wireless power supply apparatus 1_2 are eliminated. However, when the frequency bands used by the wireless power supply apparatuses 1 are very close to the frequency band used by the victim system, the complete separation of the frequency bands by the filters may be difficult. For example, as indicated by band a5 shown in FIG. 4, the passband of the fitters may take frequency spectrum a2 of wireless power supply apparatus 1_2. This phenomenon is also caused by the circuit restrictions (the circuit size and frequency characteristics) of the filters. In this case, it is difficult to eliminate interference signals from another wireless power supply apparatus 1 by only the filters. Thus, an inference canceller function should be preferably provided FIG. 5 shows a configuration example of the carrier sensor 130 further comprising an interference canceller function (interference canceller function module 130B) as a structural element of the interference avoidance function module 130A. The carrier sensor 130 shown in FIG. 5 is different from the carrier sensor 130 shown in FIG. 3 in terms of the structure in which a subtractor 201, a frequency analyzer 202 and a digital synthesizer 203 are added. In a manner similar to the explanation of FIG. 3, in the structure shown in FIG. 5, a signal received via the antenna 110 is transmitted to the digital circuit 136 via the analog-digital converter 135. Subsequently, a frequency analysis process such as a fast Fourier transform process is performed in the frequency analyzer 202. When the frequency spectrum of the received signal is a signal spectrum having a certain bandwidth or greater, the received signal is interpreted as a transmission signal from a victim system. The signal detector 138 determines whether or nut the level of the received signal exceeds the carrier sense threshold Th. When the frequency spectrum of the received signal includes both the signal spectrum having a wide band and the signal spectrum having a narrow band, a signal having a wide band is interpreted as a transmission signal from a victim system, and a signal having a narrow band is interpreted as a power supply signal from another wireless power supply apparatus 1. Only the power information of a signal component having a wide band is transmitted to the signal detector 138, and carrier sense is performed. When the frequency spectrum of the received signal is only a line spectrum or a narrow-bandwidth spectrum, it is determined that a power supply signal from another wireless power supply apparatus 1 is received. In this case, there is a possibility that only a power supply signal from another wireless power supply apparatus 1 is received, and further, there is a possibility that a transmission signal from a victim system is buried. In the frequency analyzer 202, the information of center frequency Fc of the frequency spectrum of the analyzed received signal is transmitted to the digital synthesizer 203. In the digital synthesizer 203, a sine-wave signal having the same frequency as the indicated center frequency Fc is generated, and the generated signal transmitted to the subtractor 201 as a signal for cancelling interference. In the substractor 201, a process for subtracting an interference cancelling signal is applied to the received signal, and thus, an interference signal is cancelled from the received signal. As a result, it is possible to perform carrier sense which avoids the effect of a power supply signal from another wireless power supply apparatus 1. In ether words, the interference canceller function (interference canceller function module 130B) including the subtractor 201, the frequency analyzer 202 and the digital synthesizer 203 also restricts the target of carrier sense to a signal which can be assumed to be the signal of a wireless system.

When the interference canceller function (interference canceller function module 130B) including the subtractor 201, the frequency analyzer 202 and the digital synthesizer 203 is provided, as the structural elements of the interference avoidance function module 130A, the analog filter 133 or the digital filter 137 may not be provided, or they may be used together.

Thus, a signal having a certain frequency band is eliminated from a signal received at the time of carrier sense by the interference avoidance function module 130A and/or the interference canceller function module 130B. The frequency band to be eliminated does not overlap, for example, the frequency band used by a victim system. The frequency band to be eliminated is, for example, the frequency baud used by another wireless power supply apparatus for power supply.

FIG. 6 is a flowchart showing an example of the procedure of the carrier sense process and the power supply process performed by the wireless power supply apparatus 1 according to the present embodiment.

The wireless power supply apparatus 1 starts the time count of carrier sense (S101). The wireless power supply apparatus 1 receives a signal in the antenna (S109), and applies the band restrictions to the received signal by the filters (S103). The wireless power supply apparatus 1 eliminates a signal less than a certain bandwidth by a canceller (S104).

Subsequently, the wireless power supply apparatus 1 determines whether or not a signal having signal strength greater than or equal to a threshold is present (S105). When a signal having signal strength greater than of equal to the threshold is present (S105: YES), the wireless power supply apparatus 1 stops the time count of carrier sense (S106), returns to S102 and repeats the process from S102.

When no signal having signal strength greater than or equal to the threshold is present (S105: NO), and the time count of carrier sense is stopped (S107: YES), the wireless power supply apparatus 1 restarts the time count of carrier sense (S108). When the time count is not stopped (S107: NO), or when the time count of carrier sense is restarted in S108, the wireless power supply apparatus 1 determines whether or not the time count reaches the carrier sense period (S109).

When the time count does not reach the carrier sense period (S109: NO) , the wireless power supply apparatus 1 returns to S102 and repeats the process from S102. When the time count reaches the carrier sense period (S109: YES), the wireless power supply apparatus 1 starts power supply (S110). At this time, the wireless power supply apparatus 1 starts the time count of power supply.

The wireless power supply apparatus 1 monitors the time count of power supply regarding whether or not the time count reaches the power supply period (S111). When the time count does not reach the power supply period (S111: NO), the wireless power supply apparatus 1 continues power supply (S112). When the time count reaches the power supply period (S111: YES), the wireless power supply apparatus 1 terminates power supply (S113), returns to S101 and repeats the process from S101. In other words, carrier sense is restarted.

Figure 7:
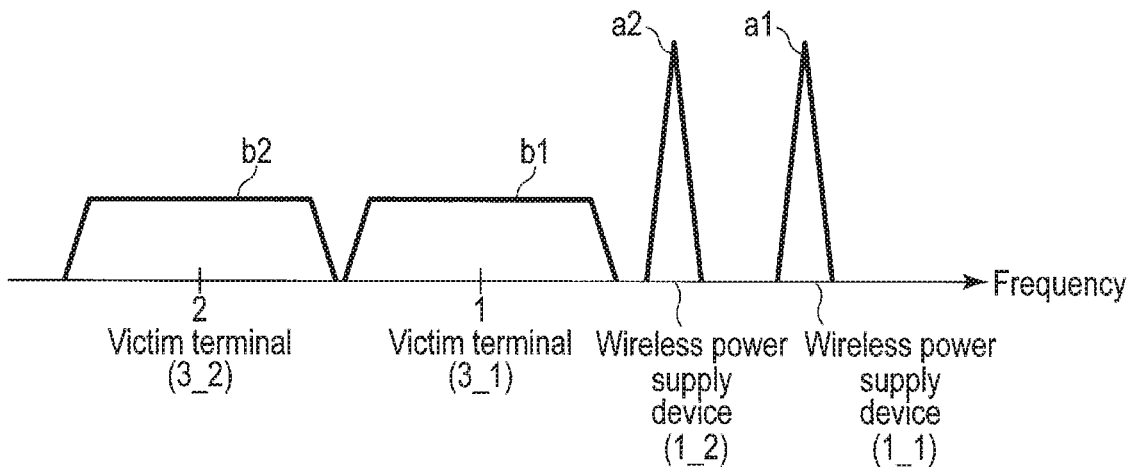
FIG. 7 is a diagram showing an example of frequency spectra when carrier sense is performed by dividing the frequency band in the power supply apparatus according to the first embodiment.

When carrier sense is performed in the carrier sensor 130 exemplarily shown in FIG. 3 and FIG. 5, the frequency band (band a4 in FIG. 4) may be divided. FIG. 7 shows an example of frequency spectra in this case. In the example of frequency spectra in FIG. 7, similarly, the vertical axis indicates the signal strength, and the horizontal axis indicates the frequency. For example, when wireless power supply apparatus 1_1 performs the carrier sense of a near frequency band, the carrier sense is performed separately for band b1 and band b2. Specifically, a downconvert process is performed by setting the frequency of an oscillatory signal mixed with the received signal in the mixer 132 of FIG. 3 and FIG. 5 to center frequency F1 of band b1 and center frequency F2 of band b2. In a case where carrier sense is performed while dividing the band, spectrum a2 of a power supply signal from another wireless power supply apparatus 1_2 could interfere with only a carrier sense process for band b1 which is the frequency band closest to spectrum a2 of the power supply signal. Thus, only in a case where carrier sense is performed for band b1, the above filter process and interference cancelling process should be performed. Regarding a filter process, in the case of carrier sense for band b1, the analog filter 133 and the digital filter 137 having a steep passband property are applied. In a case where carrier sense for another band b2 is performed, other filters 133 and 137 having a gentle passband property are used, or a process in which filter 133 or 137 is not passed through is performed. A filter process has problems. For example, as the passband is steeper, the received signal is more distorted, or the power necessary for the process is increased. Thus, it is effective to adaptively perform a filter process and an interference cancelling process in accordance with the band of carrier sense.

The configurations of the carrier sensor 130 shown in FIG. 3 and FIG. 5 are merely examples, and may be other configurations. For example, a direct conversion system for downconverting a received signal into a baseband by the mixer may be employed. A low-IF system for downconverting a received signal into a low intermediate frequency band may be employed. A superheterodyne system for downconverting a received signal in two stages may be adopted. The number of element circuits such as the mixer and the analog filter may be two or more.

As described above, the wireless power supply system of the present embodiment can realize both the avoidance of interference from another wireless power supply apparatus 1 and the avoidance of interference with another wireless system since the wireless power supply apparatus 1 comprising a carrier sense function comprises at least one of an analog filter and a digital filter, or an interference canceller, in other words, at least one of an analog filter, a digital filter and an interference canceller. Thus, the wireless power supply system of present embodiment is allowed to accurately perform carrier sense for avoiding interference with respect to a wireless system.

Second Embodiment

A second embodiment is explained. The present embodiment relates to a wireless power supply apparatus which performs power transmission using electromagnetic waves in a manner similar to that of the first embodiment. The same structural elements as the first embodiment are denoted by the same reference numbers, overlapping explanations thereof being omitted.

In the first embodiment, this specification explains that the wireless power supply apparatus 1 comprises the carrier sensor 130, and the carrier sensor 130 comprises the configurations shown in FIG. 3 and FIG. 5. According to the present embodiment, a wifeless power supply apparatus 1 comprises the original gain control method of amplifiers in the configurations regarding a carrier sensor 130. Specifically, the gain of the amplifiers is controlled so as to accurately detect the presence or absence of a received signal at a level exceeding a carrier sense threshold Th. By controlling the gain in this way, at is possible to adjust the timing of carrier sense and the timing of power supply with respect to another wireless power supply apparatus 1 and decrease the number of times of reception of interference.

These signal detection processes are performed in the power detector of an analog circuit or the signal detector of a digital circuit. However, the level of the signal power which can be detected by these modules has restrictions. In general wireless systems, the range of the signal strength of received signals is approximately 60 to 100 dB. In other words, when the minimum level of received signals is 1, the maximum level of received signals is from 10 to the 6th power to 10 to the 10th power. By contrast, in many cases, the detection range of an analog power detector or an analog-digital converter which determines the processable signal range in a digital circuit is approximately 30 to 50 dB. Thus, it is not possible to cover all the assumable signals to be received. For example, the level of received signals assumed by the wireless power supply apparatus 1 at the time of a carrier sense process is assumed to be in a range of 80 dB in total from −90 to −10 dBm, and the detection range of an analog-digital converter 135 in the carrier sensor 130 is assumed to be 40 dB. When the wireless power supply apparatus 1 does not amplify received signals at all, the analog-digital converter 135 appropriately operates for only the signals in a range of 40 dB from −90 to −50 dBm. All the signals at a level greater than −50 dBm are saturated. Thus, it is necessary to appropriately amplify received signals in the low-noise amplifier 131 and the variable gain amplifier 134 of the carrier sensor 130 shown in FIG. 3 and FIG. 5 and appropriately detect the signals in the analog-digital converter 135 and an analog power detector.

Figure 8:
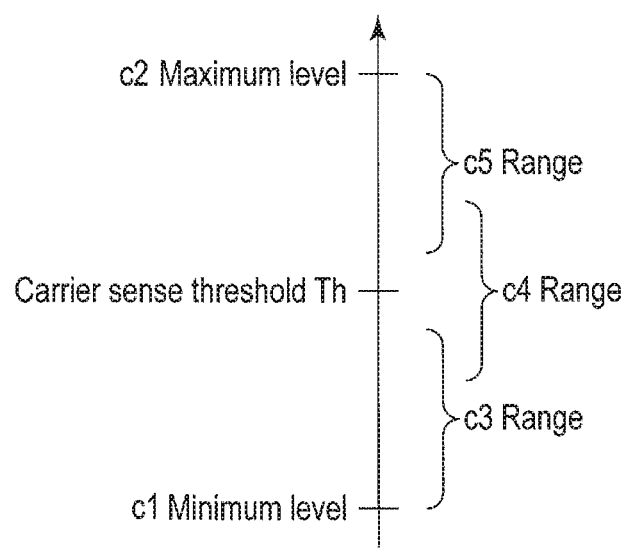
FIG. 8 is a diagram showing an example of the gain control of amplifiers in a power supply apparatus according to a second embodiment.

FIG. 8 shows an example of the gain control of the amplifiers according to the present embodiment. To cover the minimum value c1 to the maximum value c2 of the level of received signals, for example, the gain of the amplifiers is controlled in three stages. At the time of the least gain, received signals can be detected in range c3. At the time of the intermediate gain, received signals can be detected in range c4. At the time of the greatest gain, received signals can be detected in range c5. By variably adjusting the gain based on the level of received signals, the signals can be correctly received.

However, in the wireless power supply apparatus 1 of the present embodiment, the gain of the amplifiers is not variably controlled, and is fixed. Specifically, the gain of the amplifiers is set so as to detect received signals in range c4 including a carrier sense threshold Th. Since the threshold Th of the level of received signals in carrier sense is a value determined in advance based on the specification and the link-budget calculation of a victim system, etc., the gain of the amplifiers in a reception range including the threshold Th is also known. The carrier sense threshold Th is less than the maximum value c2 of the level of received signals.

In the carrier sense in the wireless power supply apparatus 1, as explained with reference to FIG. 2, a carrier sense process and wireless power supply are alternately repeated. The time (T11) of carrier sense and the time (T12) of wireless power supply are also fixed, or a part of a plurality of set times determined in advance. If a power supply process is indefinitely continued, in the case of coexistence with a victim system, the system may not be able to use a channel.

FIG. 9 shows an example of the timing chart of a carrier sense process and a power supply process in the wireless power supply apparatus 1 of the present embodiment. Wireless power supply apparatus 1_1 performs carrier sense at time t1. At this time, if another wireless power supply apparatus 1_2 is in the process of power supply, the power supply signals cause interference. The wireless power supply apparatus 1 determines the state as channel busy and stops the time count of carrier sense. At this time, the wireless power supply apparatus 1 does not adaptively control the gain of the amplifiers in accordance with the level of interference signals, and fixes the gain to gain in accordance with the carrier sense threshold Th determined in advance (in other words, to gain inducting the carrier sense threshold Th). At time t2, wireless power supply apparatus 1_2 stops power supply and starts carrier sense. At this time, in wireless power supply apparatus 1_1, interference is eliminated. Thus, wireless power supply apparatus 1_1 starts the count of carrier sense. As a result, the carrier sense operations of both wireless power supply apparatus 1_1 and wireless power supply apparatus 1_2 are parallelly performed in the same timing. If the gain of the amplifiers is variably controlled in accordance with the level of the received signal, wireless power supply apparatus 1_1 needs to largely change the gain of the amplifiers since the level of the received signal is steeply changed at time t2. In this way, wireless power supply apparatus 1_1 requires a time to deal with the change. Thus, the timing of carrier sense is not matched with that of wireless power supply apparatus 1_2. This gap in the timing can be avoided by setting the gain of the amplifiers so as to be a fixed value in accordance with the carrier sense threshold. When no signal greater than or equal to the threshold is detected in any wireless power supply apparatus 1 in the carrier sense subsequent to time t2, power supply is simultaneously started at time t3. Subsequently, power supply is stopped at time t4, and each power supply apparatus performs carrier sense again. It is highly possible that the wireless power supply apparatuses 1 located so close to each other as to interfere with each other have a similar environment regarding the coexistence with a victim system. Thus, when carrier sense is performed in the same timing, the subsequent time point for starting power supply and time point for stopping waves can be also matched between the wireless power supply apparatuses 1. As a result, power supply can be performed without interference with each other.

A plurality of wireless power supply apparatuses 1 do not need to be synchronized with each other to match the timing of carrier sense or the timing of power supply between the wireless power supply apparatuses 1. When the gain of the amplifiers is fixed in accordance with the carrier sense threshold, and the carrier sense time (T11) and the subsequent power supply time (T12) of the wireless power supply apparatuses 1 are the same as each other, naturally, the time of carrier sense and power supply is matched between the wireless power supply apparatuses 1. Each of the carrier sense time and the subsequent power supply time is a fixed value (or one of a plurality of set values determined in advance) as a power supply system. There is a high possibility that the wireless power supply apparatuses 1 provided close to each other use the same values.

Even if a plurality of power supply apparatuses 1 use different values for the carrier sense time and the power supply time, the effect of the present embodiment can be obtained. In this case, one of the time point for starting power supply and the time point for terminating power supply is not matched. However, an effect of reducing the time in which power supply signals interfere with each other can be expected.

Even when a signal greater than or equal to the threshold is detected in the carrier sense of one of the wireless power supply apparatuses 1, and is not detected in the other wireless power supply apparatus 1, the effect of the present embodiment can be obtained. In this case, the time point for terminating carrier sense is not matched. However, the time point for starting carrier sense after the end of power supply is matched. Thus, an effect of reducing the time in which power supply signals interfere with each other can be obtained.

The wireless power supply apparatus 1 may presume the carrier sense time and the power supply time of another wireless power supply apparatus 1. When interference from another wireless power supply apparatus 1 is caused, it is possible to presume that the interference duration time is equal to the power supply time and the interference reduction time is equal to the carrier sense time by observing the time in which the interference continues and the time in which the interference is reduced for a long time. Since the wireless power supply apparatus 1 operates while adjusting t carrier sense time and the power supply time of the self-device in accordance with the presumed times, the timing of carrier sense and the timing of power supply are naturally matched with those of another wireless power supply apparatus 1. Thus, the wireless power supply apparatus 1 is allowed to perform power supply and carrier sense without interference with (from) another wireless power supply apparatus 1.

The above match of the timing between the wireless power supply apparatuses is established when the clock accuracy is substantially the same as each other. When the clock accuracy is great, in other words, when the clock difference is large, the timing, may not be matched. For example, when the clock difference of wireless power supply apparatus 1_1 is +5 ppm, and the clock difference of wireless power supply apparatus 1_2 is −5 ppm, the relative difference in the clock between them is 10 ppm, When the time of 100 ms is counted, a time lag of up to 100 ms×10 ppm=1 µs is generated. The wireless power supply apparatus may perform power supply in consideration of this clock difference. FIG. 10 shows an example of the timing chart of a power supply process in consideration of the clock difference. In FIG. 10, the process until time t2 is the same as that of FIG. 9. At time t2, wireless power supply apparatus 1_1 and wireless power supply apparatus 1_2 start carrier sense at the same time. At this time, it is assumed that the clock of wireless power supply apparatus 1_1 operates faster than ideal, and the clock of wireless power supply apparatus 1_2 operates slower than ideal. In this case, the carrier sense of wireless power supply apparatus 1_1 ends at time t3_1 earlier than ideal time t3. The carrier sense of wireless power supply apparatus 1_2 continues until time t3_2 later than ideal time t3. If wireless power supply apparatus 1_1 terminates carrier sense at time t3_1 and immediately starts power supply, wireless power supply apparatus 1_2 determines the state as channel busy and stops the time count of carrier sense. Thus, wireless power supply apparatus 1_2 cannot start power supply. In this way, the power supply time is largely shifted between the wireless power supply apparatuses. To avoid this situation, after carrier sense ends at time t3_1, wireless power supply apparatus 1_1 does not immediately start power supply, and waits for only standby time ΔT and starts power supply from time t3_3. Here, the standby time ΔT is the maximum accumulation value of the clock difference accumulated during the carrier sense period T11. In general, the clock accuracy of wireless devices is defined as a specification value. For example, when the clock accuracy is defined as ±E [ppm], the maximum value of the clock difference between two power supply apparatuses is (+E)−(−E)=2E [ppm]. In this case, the maximum accumulation value ΔT of the clock difference in the carrier sense period T11 can be calculated as T11×2E×10^(−6). When wireless power supply apparatus 1_1 waits for only the maximum accumulation time ΔT of the clock difference, wireless power supply apparatus 1_2 is allowed to complete carrier sense at time t3_2 during the waiting. Wireless power supply apparatus 1_1 starts power supply from time t3_3 at which the standby time ΔT ends. Subsequently, the power supply is terminated at time t4_1 when the elapsed time from the start time t3_1 of the standby time ΔT reaches the power supply time T12 set in advance (in other words, t4_1−t3_1=T12). Similarly, wireless power supply apparatus 1_2 waits for only the standby time ΔT from time t3_2 at which carrier sense ends, and start power supply from time t3_4. The power supply is terminated at time t4_2 when the elapsed time from the start time t3_2 of the standby time ΔT reaches the power supply time T12. Wireless power supply apparatus 1_1 restarts carrier sense after terminating power supply at time t4_1. Since wireless power supply apparatus 1_2 is in the process of power supply, the state is determined as channel busy. At time t4_2 when the power supply of wireless power supply apparatus 1_2 ends, the channels of both of the wireless power supply apparatuses are cleared, and the time count of carrier sense is restarted at the same time. As described above, the wireless power supply apparatuses do not start power supply immediately after carrier sense ends. The wireless power supply apparatuses perform central by performing power supply after waiting for only the accumulation maximum time of the clock difference. As a result, even when a clock difference is caused, a plurality of power supply apparatuses can perform a carrier sense process in the same timing.

As described above, in the wireless power supply system of the present embodiment, when the wireless power supply apparatus 1 controls the gain of the amplifiers in the carrier sensor 130, the timing of carrier sense and the timing of power supply can be matched with those of another wireless power supply apparatus 1 which is the source of interference. As a result, the wireless power supply apparatus 1 is allowed to reduce an opportunity to receive interference from the power supply signal of another wireless power supply apparatus 1 when performing the carrier sense. Thus, the wireless power supply system of the present embodiment is allowed to accurately perform carrier sense for avoiding interference with respect to a wireless system.

Third Embodiment

A third embodiment is explained. The present embodiment relates to a wireless power supply apparatus which performs power transmission using electromagnetic waves in a manner similar to that of the first embodiment and the second embodiment. The same structural elements as the first embodiment and the second embodiment are denoted by the same reference numbers, overlapping explanations thereof being omitted.

Figure 11:
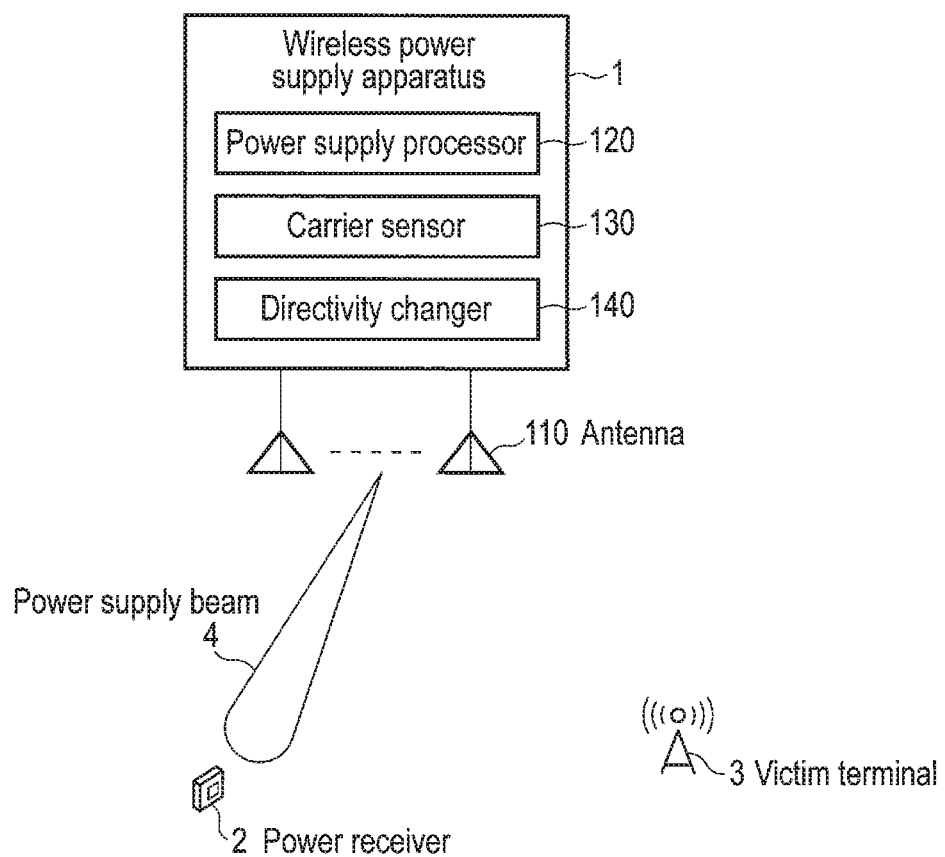
FIG. 11 is a diagram showing a configuration example of a wireless power supply system according to a third embodiment.

FIG. 11 shows a configuration example of a wireless power supply system according to the present embodiment. The configuration example of the present embodiment differs from that of the first embodiment shown in FIG. 1 in respect that a wireless power supply apparatus comprises a directivity changer 140. The wireless power supply apparatus 1 performs a process for changing the directivity in the directivity changer 140 when the wireless power supply apparatus 1 determines that receives the interference caused by a power supply signal from another wireless power supply apparatus 1. The wireless power supply apparatus 1 may determine that interference is received when the level of the received signal in a carrier sensor 130 exceeds a predetermined threshold, or may determine that interference is received when the time for receiving a signal at a level exceeding the threshold is greater than or equal to a certain value. Alternatively, the wireless power supply apparatus 1 may analyze the frequency spectrum of the received signal, and determine that interference is received when a narrow-bandwidth spectrum or line spectrum is received.

The directivity changed in the directivity changer 140 is the directivity of an antenna 110 provided in the wireless power supply apparatus 1. In the present embodiment, the antenna 110 is used for both power supply and carrier sense, in other words, both transmission and reception. In other words, the same directivity is used for the transmission directivity at the time of transmission and the reception directivity at the time of reception. By using the same directivity at the time of transmission and at the time of reception, only the signals from a victim terminal 3 present in the power supply area of transmission (energy supply) can be the target of carrier sense. When power greater than or equal to a threshold is detected in carrier sense, the power supply area may be interpreted as a power supply area in which the wireless power supply apparatus 1 coexists with a victim terminal 3 or another wireless power supply apparatus 1. Thus, the directivity of the power supply beam is changed in the directivity changer 140 for the correction of the power supply area. When power greater than or equal to the threshold is not detected in carrier sense after changing the directivity, the power supply area may be interpreted as a power supply area which does not include any victim terminal 3 or other wireless power supply apparatuses 1. Thus, a power supply process which neither gives interference nor receives interference can be realized.

The directivity may be changed in an analog process or a digital process. In the case of an analog process, the antenna 110 is structured as a directional antenna. A process for mechanically controlling the direction of the antenna is performed. In the case of a digital process, the antenna 110 is structured as a phased array antenna allowed to electrically adjust the strength and phase. The directivity is changed by controlling the weight (at least one of the signal strength and the phase value) of the signal supplied to each array element. A power supply processor 120 provided in the wireless power supply apparatus 1 also includes a function for controlling the directivity of the power supply beam. directivity changer 140 comprises a function for changing the control information for directivity control in the power supply processor 120 (in other words, the information of the direction and weight of the antenna 110).

FIG. 12 shows an example of the change in the directivity. In FIG. 12(A), when wireless power supply apparatus 1_1 determines that interference (interference wave d1) is received from another wireless power supply apparatus 1_2, wireless power supply apparatus 1_1 slightly shifts the directivity of power supply beam 4_1 by the directivity changer 140, and forms power supply beam 4_2. The shifting direction may be constant or random. Alternatively, wireless power supply apparatus 1_1 may comprise an array antenna as the antenna 110, estimate the direction of arrival when a power supply signal from another wireless power supply apparatus 1_2 is received in the array antenna, and perform control such that the power supply beam is not radiated in the estimated direction. As shown in FIG. 12 (B), the directivity may be formed such that power supply beam 4_3 comprises a null (notch) d2 which faces the estimated direction of the interference wave d1. Instead of estimating the direction of arrival of the interference wave d1, the location and direction of the installation of another wireless power supply apparatus 1_2 may be set in the wireless power supply apparatus 1 in advance. When the wireless power supply apparatus 1 determines that interference is caused, the directivity may be formed such that power supply beam 4_3 does not face the direction of another wireless power supply apparatus 1_2 set in advance. As shown in FIG. 12(C), power supply beam 4_4 may be formed by changing the shape of power supply beam 4_1. In a case where interference is received at the time of forming a sharp directivity as indicated by power supply beam 4_1, the directive gain per angle is reduced by changing the directivity to a broad directivity as indicated by power supply beam 4_4. Thus, the strength of the received interference can be reduced. As shown in FIG. 12(D), the directivity may be sequentially changed to a plurality of power supply beam patterns 4_5, 4_6 and 4_7 determined in advance. Directivity other than power supply beam pattern 4_5 determined as a power supply bean pattern which receives interference may be used. In other words, the directivity charger 140 sets the beam direction so as to be a direction other than the estimated direction of arrival of the signal used for the power supply.

The change in the directivity exemplarily shown in FIG. 12 should be preferably performed so as not to decrease the energy supplied to a power receiver. The wireless power supply apparatus 1 receives a signal transmitted from a power receiver 2 and learns at least one of the location, direction and amount of power reception of the power receiver 2. Alternatively, the information of the location and direction of the power receiver 2 is set in the internal memory of the wireless power supply apparatus 1 in advance. When the wireless power supply apparatus 1 changes the directivity of the power supply beam 4, the wireless power supply apparatus 1 prevents an extreme reduction in the energy supplied to the power receiver 2. For example, the wireless Power supply apparatus 1 changes the directivity by applying restrictions such that the relative angle from the wireless power supply apparatus 1 respect to the power receiver 2 is less than or equal to a certain value. Alternatively, the power receiver 2 notifies the wireless power supply apparatus 1 of the amount of power reception every time the directivity is changed. Only the directivity which can assure a certain amount of power reception or greater is used power supply.

As explained with reference to FIG. 7, in a case where carrier sense is performed separately for a plurality of bands b1 and b2, only when carrier sense is performed for band b1 closest to the power supply frequency, the above process for changing the directivity may be performed to avoid interference from another wireless power supply apparatus 1.

As described above, the wireless power supply apparatus 1 of the present embodiment is allowed to realize both the avoidance of interference and power supply by controlling the directivity based on the determination regarding whether or not interference from another wireless power supply apparatus 1 is caused. Thus, the wireless power supply system of the present embodiment is allowed to accurately perform carrier sense for avoiding interference with respect to a wireless system.

Fourth Embodiment

A fourth embodiment as explained.

Figure 13:
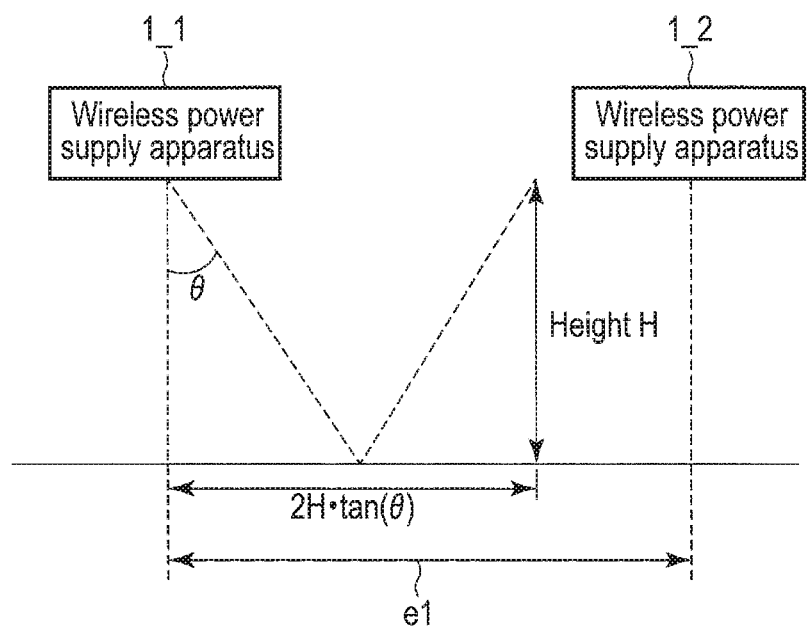
FIG. 13 is a diagram showing a configuration example of a wireless power supply system according to a fourth embodiment.

FIG. 13 shows a configuration example of a wireless power supply system according to the present embodiment. In the wireless power supply system of the present embodiment, wireless power supply apparatus 1_1 and wireless power supply apparatus 1_2 are installed such that they do not interfere with each other Each wireless power supply apparatus 1 (1_1, 1_2) is installed in a place having height H or greater. The power supply area can be wide by radiating a downward power supply beam from a high altitude. A power supply beam is an electromagnetic wave having directivity. When the directivity is controlled by the phase adjustment of an array antenna for power supply, it is known that the gain is decreased (the amount of power supply is decreased) as the angle of the beam is increased. Thus, the width of the power supply beam should be preferably restricted to a certain width for use. For example, when the perpendicular downward direction from the installation location of each wireless power supply apparatus 1 is set as a standard, a power supply process is performed such that the direction of the maximum value ±3 dB is from −θ to +θ. In this case, the wireless power supply system of the present embodiment is installed such that the distance e1 between the wireless power supply apparatuses 1 is greater than or equal to $2H\{\tan(\theta)\}$. Here, $2H\{\tan(\theta)\}$ is the distance a horizontal direction when the wireless power supply apparatuses 1 radiate a power supply beam at the maximum angle θ and its signal is reflected once and arrives at the same height H. It is possible to avoid a power supply signal which is reflected once from causing interference by providing two wireless power supply apparatuses 1 such that they are $2H\{\tan(\theta)\}$ or greater distant from each other. For example, two wireless power supply apparatuses 1 are provided such that they are $2H\{\tan(\theta)\}$ or greater distant from each other in a horizontal direction. In the above explanation, height H is defined as the distance from the floor surface to each power supply apparatus. However, when a reflector such as a metal fixture is present around each power supply apparatus, the distance should be preferably replaced by the difference in height between the fixture and each power supply apparatus. When an object which absorbs an electromagnetic wave, such as a wall, is present between power supply apparatuses, the distance may be less than or equal to $2H\{\tan(\theta)\}$. Alternatively, when the wireless power supply system comprises a plurality of wireless power supply apparatuses 1, and $2H\{\tan(\theta)\}$ cannot be assured as the distance between some of the wireless power supply apparatuses 1, interference may be avoided by providing a radio wave absorption film, etc., around the wireless power supply apparatuses 1. Thus, the wireless power supply system of the present embodiment is allowed to accurately perform carrier sense for avoiding interference with respect to a wireless system by providing a plurality of wireless power supply apparatuses such that they do not interfere with each other.

In wireless power supply system of the present embodiment, as explained with reference to FIG. 2, wireless power supply apparatus 1_1 and wireless power supply apparatus 1_2 installed as described above alternately repeat a process for carrier sense and power supply.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus comprising:
power transmission circuitry configured to transmit power by an electromagnetic wave with a first frequency band; and
detection circuitry configured to receive a reception signal and to perform carrier sense with a second frequency band different from the first frequency band,
wherein:
the detection circuitry comprises interference avoidance circuitry configured to eliminate a signal having a third frequency band which is a part of the second frequency band from the reception signal,
a frequency band, of the second frequency band, other than the third frequency band is used for wireless communication of another system, and
the third frequency band provides wireless power supply.

2. The electronic apparatus of claim 1, wherein the interference avoidance circuitry comprises filter circuitry in which the frequency band, of the second frequency band, other than the third frequency band is set as a passband.

3. The electronic apparatus of claim 1, wherein the detection circuitry is configured to perform the carrier sense separately by dividing the second frequency band into a plurality of frequency bands, and to perform interference avoidance for a frequency band in which a difference in frequency from the first frequency band is smallest among the plurality of frequency bands.

4. The electronic apparatus of claim 1, wherein:
when no signal greater than a predetermined value is detected during a carrier sense performed by the detection circuitry in a first period, the power transmission circuitry transmits power in a second period after the first period; and
when a signal greater than the predetermined value is detected during the carrier sense performed by the detection circuitry in the first period, the detection circuitry performs another carrier sense in a third period after the first period.

5. The electronic apparatus of claim 4, wherein a sum of a length of the third period and a length of the first period comprises a length of a period in which the carrier sense should be performed.

6. An electronic apparatus comprising:
power transmission circuitry configured to transmit power by an electromagnetic wave with a first frequency band; and
detection circuitry configured to receive a reception signal and to perform carrier sense with a second frequency band different from the first frequency band,
wherein:
the detection circuitry comprises interference avoidance circuitry configured to eliminate a signal having a third frequency band which is a part of the second frequency band from the reception signal, and
the detection circuitry is configured to perform the carrier sense separately by dividing the second frequency band into a plurality of frequency bands, and to perform interference avoidance for a frequency band in which a difference in frequency from the first frequency band is smallest among the plurality of frequency bands.

7. An electronic apparatus comprising:
power transmission circuitry configured to transmit power by an electromagnetic wave with a first frequency band; and
detection circuitry configured to receive a reception signal and to perform carrier sense with a second frequency band different from the first frequency band,
wherein:
the detection circuitry comprises interference avoidance circuitry configured to eliminate a signal having a third frequency band which is a part of the second frequency band from the reception signal,
when no signal greater than a predetermined value is detected during a carrier sense performed by the detection circuitry in a first period, the power transmission circuitry transmits power in a second period after the first period,
when a signal greater than the predetermined value is detected during a carrier sense performed by the detection circuitry in a third period, the detection circuitry transmits power in the second period after the third period, and the third period is longer than the first period, and a difference between the first period and the third period is a period in which the signal is greater than the predetermined value.

* * * * *